US012654266B2

(12) United States Patent
Chuang

(10) Patent No.: US 12,654,266 B2
(45) Date of Patent: Jun. 16, 2026

(54) CLAMPING AND POSITIONING MODULE

(71) Applicant: Hsu-Pin Chuang, Tainan (TW)

(72) Inventor: Hsu-Pin Chuang, Tainan (TW)

( * ) Notice: Subject to any disclaimer, the term of this patent is extended or adjusted under 35 U.S.C. 154(b) by 618 days.

(21) Appl. No.: 18/058,769

(22) Filed: Nov. 24, 2022

(65) Prior Publication Data

US 2024/0173807 A1 May 30, 2024

(51) Int. Cl.
B23Q 3/06 (2006.01)
B23Q 3/00 (2006.01)

(52) U.S. Cl.
CPC .............. B23Q 3/06 (2013.01); B23Q 3/007 (2013.01)

(58) Field of Classification Search
CPC .......... B23Q 3/06; B23Q 3/061; B23Q 3/007; B23Q 3/088; B23Q 1/0063; B23Q 1/0072
USPC ..... 269/309, 310, 56, 900; 29/559, 464, 271
See application file for complete search history.

(56) References Cited

U.S. PATENT DOCUMENTS

2015/0054211 A1* 2/2015 Hediger ............... B23Q 1/0072
269/309

FOREIGN PATENT DOCUMENTS

DE     202019103141 U1 *   6/2019   .......... B23Q 1/0072
TW          I580514 B      5/2017
TW         M581023 U       7/2019

OTHER PUBLICATIONS

DE202019103141—Machine Translation (Year: 2019).*

* cited by examiner

*Primary Examiner* — Brian D Keller
*Assistant Examiner* — Alberto Saenz
(74) *Attorney, Agent, or Firm* — Rosenberg, Klein & Lee

(57) ABSTRACT

The present invention relates to a clamping and positioning module, which mainly includes a base plate, wherein the base plate has a plurality of mold cavities arranged thereon. Each mold cavity includes a clamping and positioning unit installed therein and has two air flow channels arranged therein. The base plate has two air guide ports arranged thereon, and the two air guide ports are connected with the air flow channels to control the movement of the clamping and positioning units, so that multiple clamping and positioning units can be modularly integrated on the base plate according to the demand, which can reduce the volume and weight thereof, and achieve the effect of light weight and thinning, effectively improve the overall mechanical property strength and processing precision, and simplify the assembly during the installation process.

7 Claims, 8 Drawing Sheets

CLAMPING AND POSITIONING MODULE

BACKGROUND OF THE PRESENT INVENTION

Field of the Invention

The present invention relates to a clamping and positioning module, in particular to the invention and application of an integrated lightweight clamping and positioning module.

Description of Related Art

It is noted that a conventional floating clamping device used for fast positioning of objects includes a clamping rod and a chuck, which clamps or releases the clamping rod, wherein the chuck includes a ring-shaped piston disposed therein. Several springs provide a supporting effect on the piston. A ring-shaped bead holder is arranged on a central axis of the piston, and a ring-shaped interior of the bead holder forms a chamber, wherein the chamber is upwardly formed and opened to the outside, the clamping rod is axially inserted into the chamber, several steel balls are annularly arranged and embedded in the bead holder, and the piston restricts or releases the restriction on each of the steel balls, so that each of the steel balls is engaged to clamp or release the clamping rod respectively.

The various components of the above-mentioned chuck must be assembled in a base body and a cover body to form a chuck component for clamping and positioning objects. When these chucks are to be installed on the processing machine, a processing machine base is arranged on the machine, and several slots that can accommodate the chucks are milled on the processing stand according to the installation quantity, and then these chucks are independently installed in the slots one by one, and the slots are closed with an upper cover or a full cover plate. However, this type of structure still has the following problems according to actual using experiences:

1. When the piston, spring, bead holder and other components are installed in the base body, the first error value will be generated, and when the chuck is installed in the processing machine base, the second error value will be generated. Thus, in addition to the object, it cannot achieve a precise accuracy.
2. During the installation process, the base body and the cover body are placed to form a chuck, and the chuck is then placed into the processing machine base, resulting in considerable overall volume and weight, which is inconvenient to carry.
3. As mentioned above, the layer-by-layer installation process leads to complicated assembly, waste of man-hours and personnel costs.

SUMMARY OF THE PRESENT INVENTION

A main object of the present invention is to provide a clamping and positioning module, especially a module that can integrate multiple clamping and positioning units, so as to improve the lack of precision in traditional installation and effectively improve the precision.

The main objects and effects of the clamping and positioning module of the present invention can be achieved by the following specific technical means:

It mainly provides a base plate, wherein the base plate has a plurality of mold cavities arranged thereon. Each mold cavity includes a clamping and positioning unit installed therein and has two air flow channels arranged therein, wherein the base plate has two air guide ports arranged thereon, wherein the two air guide ports are connected with the air flow channels to control the movement of the clamping and positioning units, so that multiple clamping and positioning units can be modularly integrated on the base plate according to the demand, which can reduce the volume and weight thereof, and achieve the effect of light weight and thinning, effectively improve the overall mechanical property strength and processing precision, and simplify the assembly during the installation process. At the same time, the module is easy to install and wire on site and maintain in the future, thereby improving the technology and expanding the application of the customized market.

DETAILED DESCRIPTION OF THE PREFERRED EMBODIMENT

Figure 1:
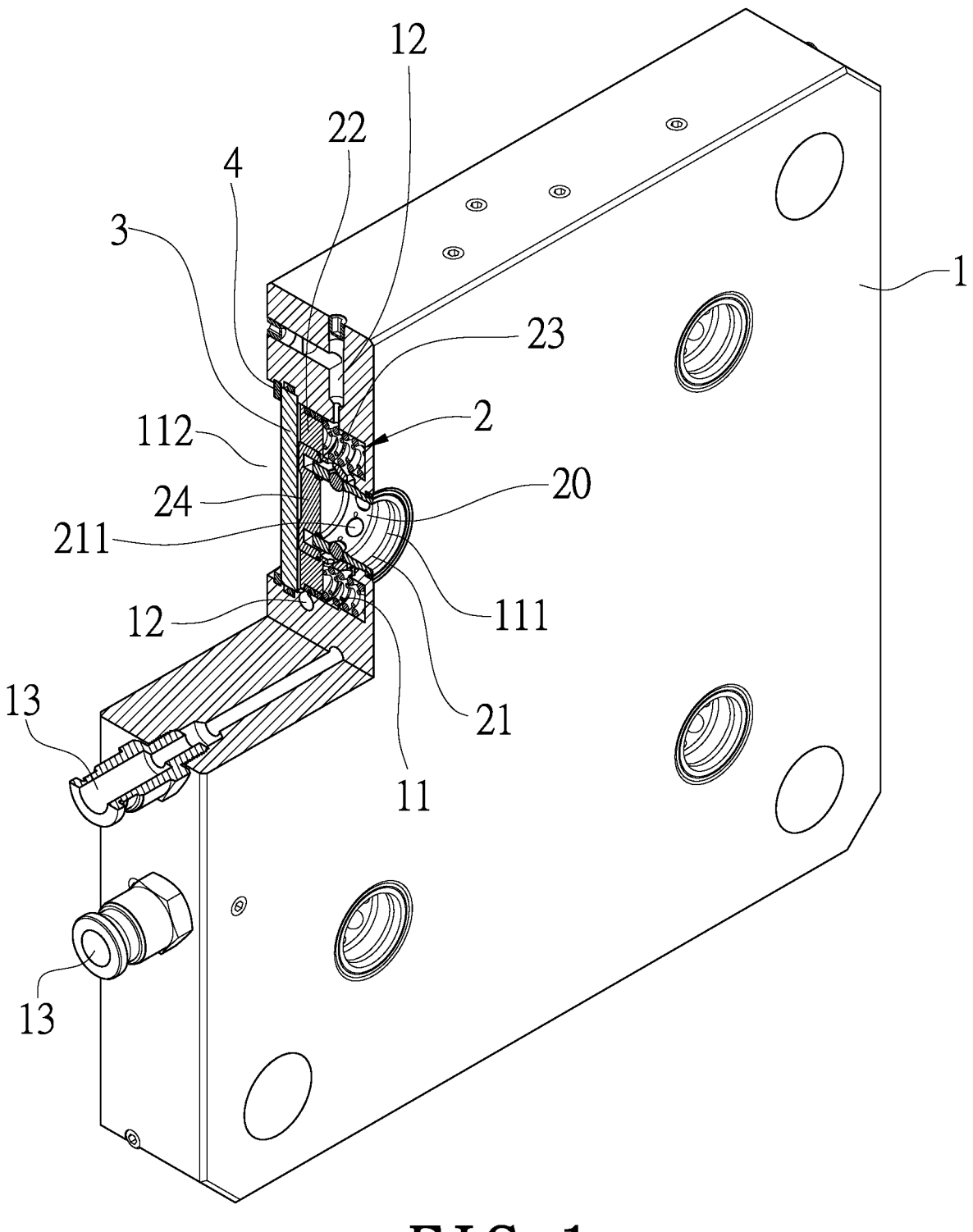
FIG. 1 is a partial sectional view of a first embodiment of the present invention (4 cavities).

First, referring to FIG. 1, a partial sectional view of a first embodiment of the present invention is illustrated, wherein the clamping and positioning module includes:

a base plate (1), which has a plurality of mold cavities (11) arranged therein, wherein each mold cavity (11) has an embedding opening (111) connected and communicated with an outside, wherein the embedding opening (111) is located on an upper end surface of the base plate (1), wherein an installation opening (112) is formed at the other end of the mold cavity (11) opposite to the embedding opening (111), wherein each mold cavity (11) has two air flow channels (12) arranged therein, wherein the base plate (1) has two air guide ports (13) arranged thereon, wherein the air guide ports (13) are respectively connected with the air flow channels (12);

a plurality of clamping and positioning units (2), each of which is assembled in the mold cavity (11) through the installation opening (112), wherein the clamping and positioning unit (2) has an embedding hole (20) for embedding a clamping rod (A), wherein the embedding hole (20) is corresponding to the embedding opening (111); and a plurality of closing elements (3), which are correspondingly embedded in the installation opening (112) to seal and close the installation opening (112) and position the clamping and positioning unit (2) in the mold cavity (11).

Figure 2:
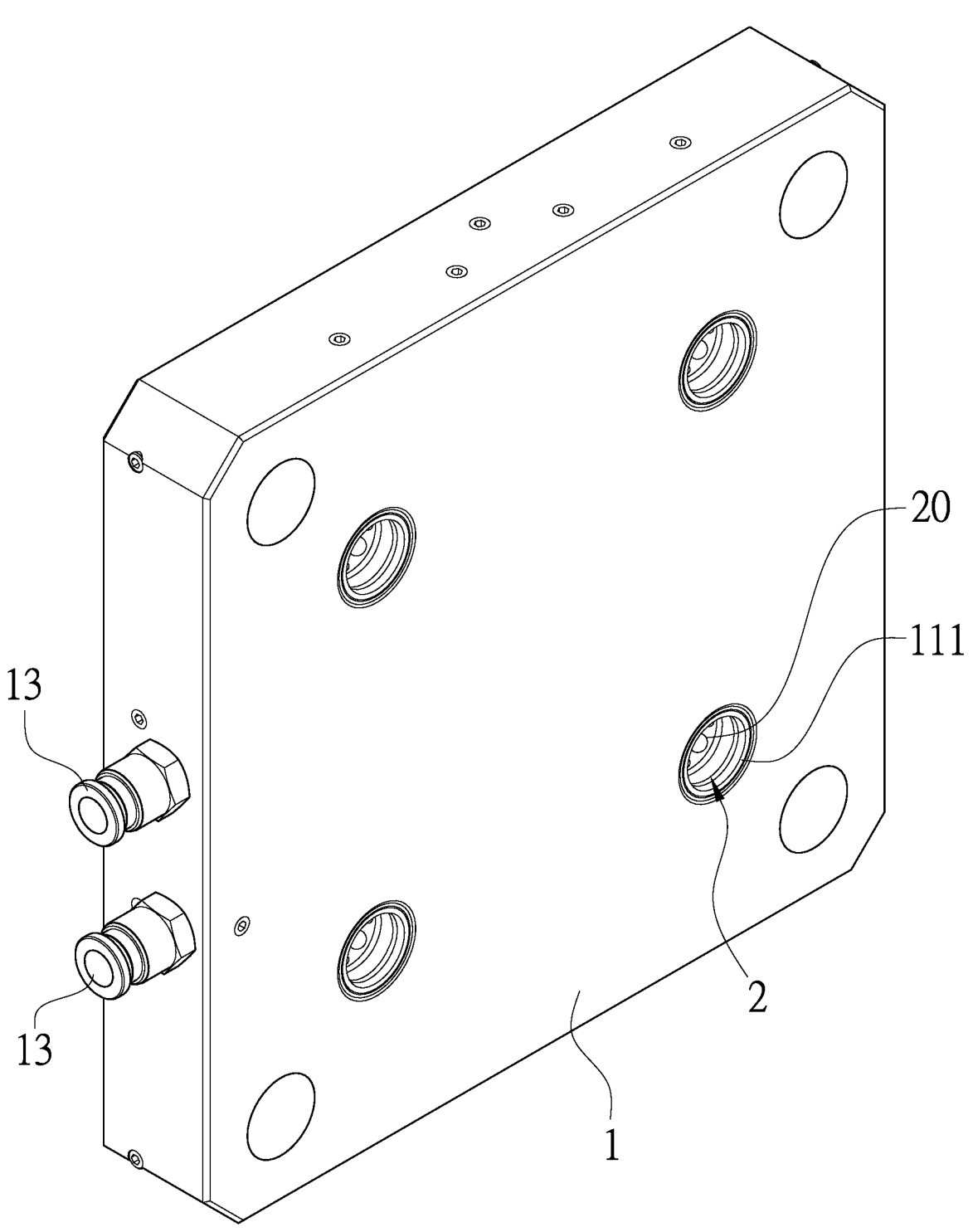
FIG. 2 is a perspective view of the above first embodiment of the present invention (4 cavities).
Figure 3:
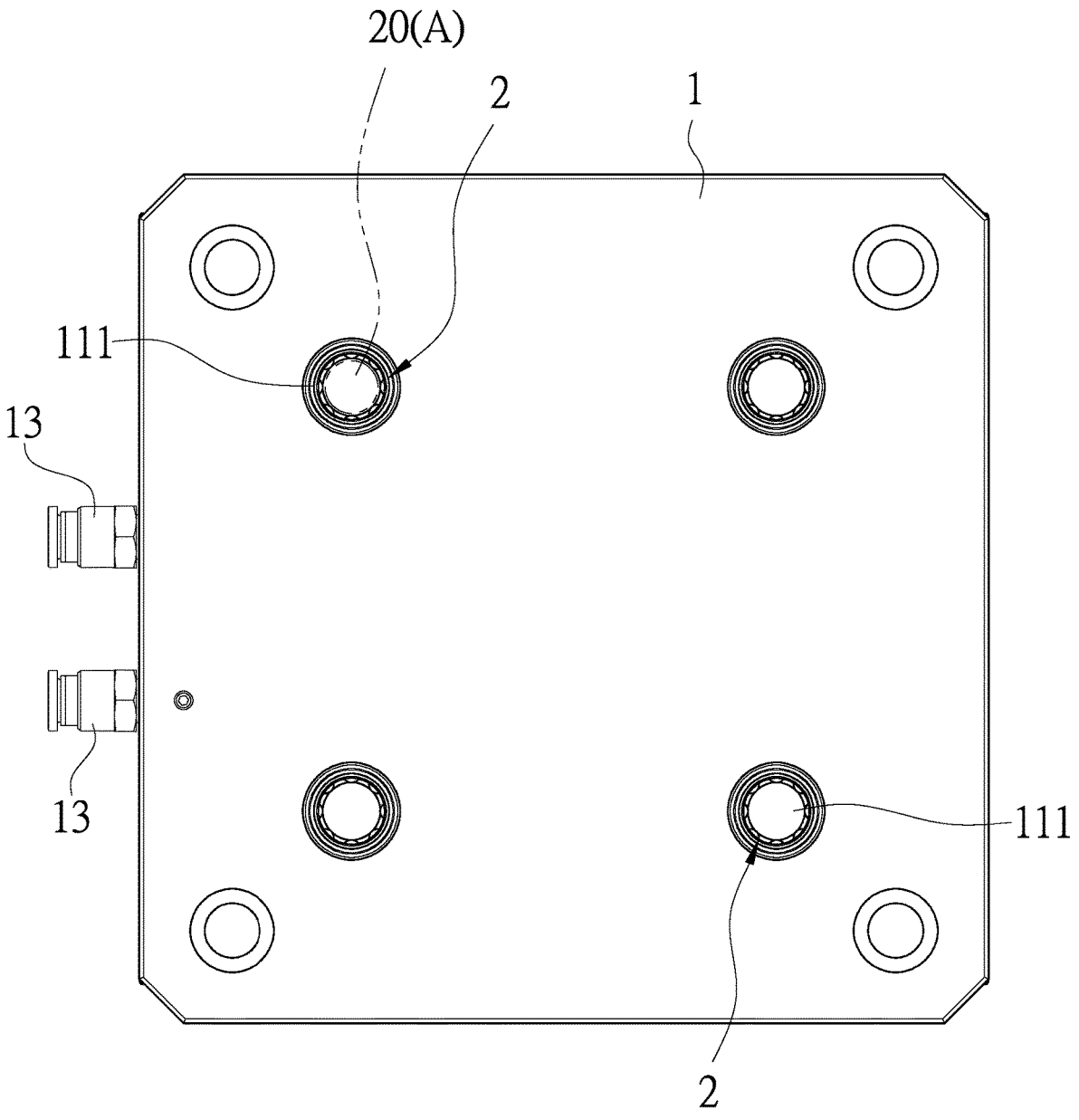
FIG. 3 is a plane perspective view of the above first embodiment of the present invention (4 cavities).
Figure 4:
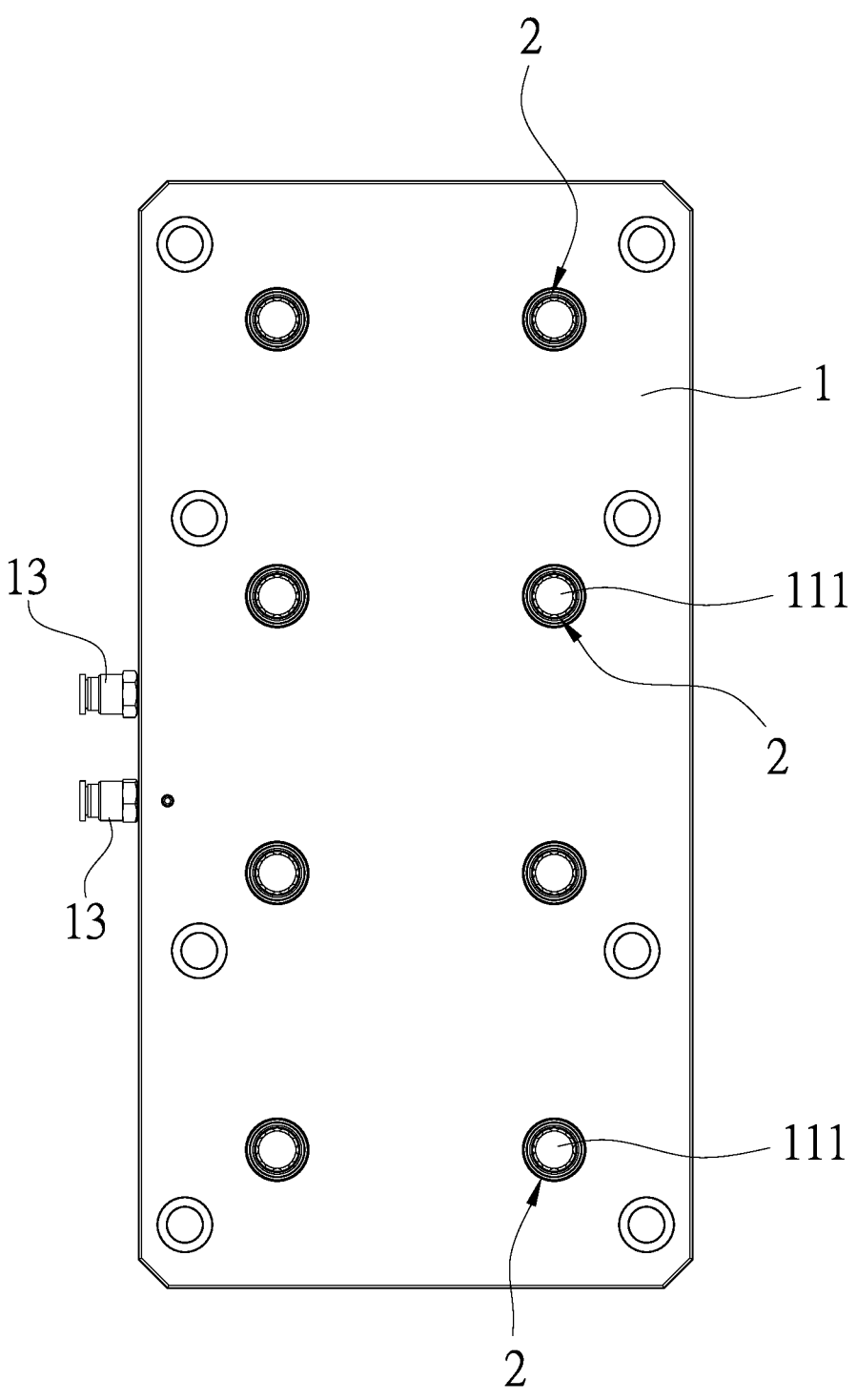
FIG. 4 is a plane perspective view of the mode of 8 cavities of the above embodiment of the present invention.
Figure 5:
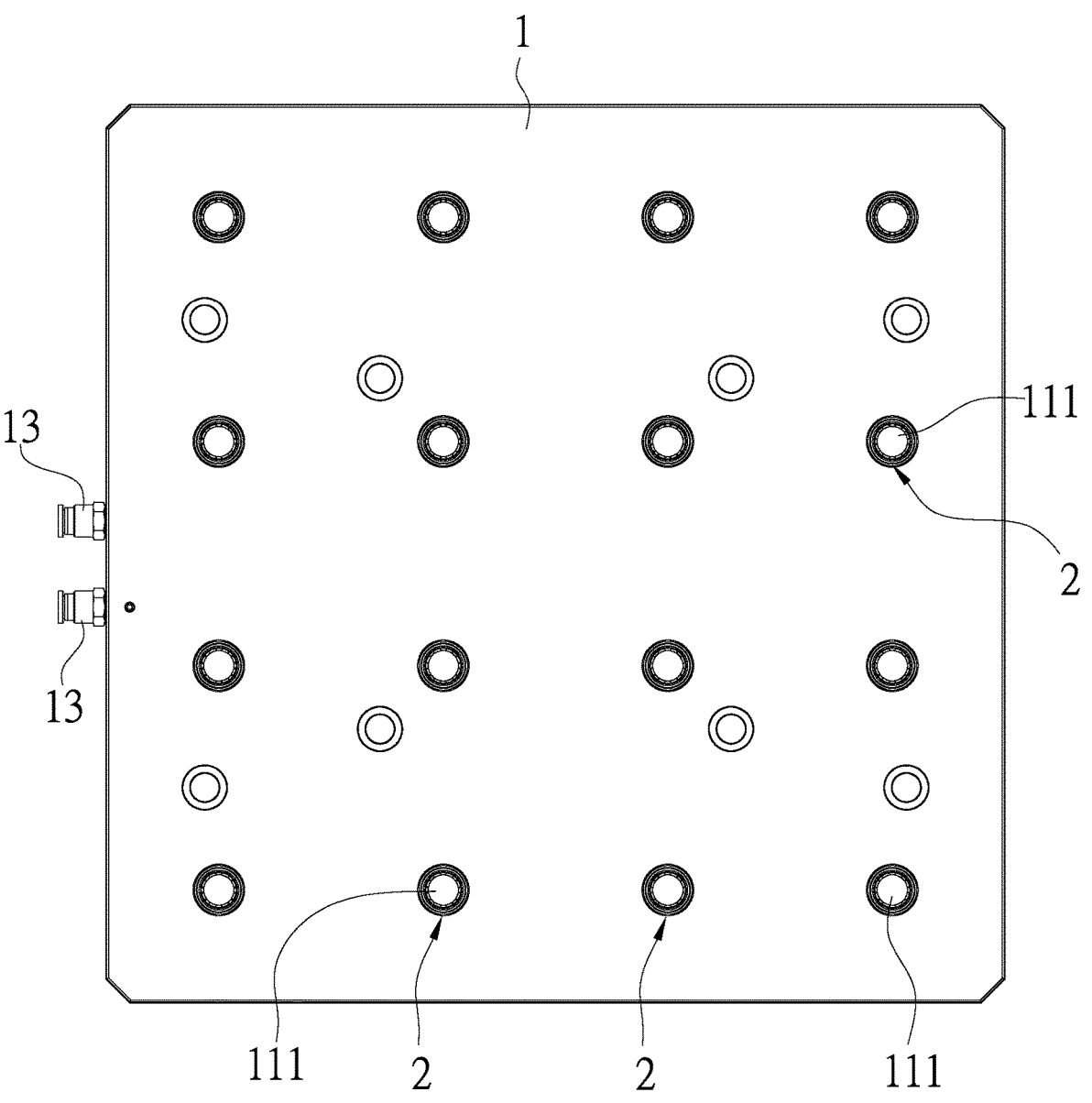
FIG. 5 is a plane perspective view of the mode of 16 cavities of the above embodiment of the present invention.

When the clamping and positioning module of the present invention is used, it is capable of forming the required quantity of mold cavities on the base plate according to the needs of users, such as 4 cavities, 8 cavities (as shown in FIG. 4) or 16 cavities (as shown in FIG. 5), or more cavities. Nevertheless, the base plate has the following possible implementations, which are illustrated as follows:

For the above first embodiment, referring to FIGS. 1 to 3, with 4 cavities illustrated, the required number of mold cavities (11) (4 cavities) are processed and formed on the base plate (1). Each mold cavity (11) has an embedding opening (111) provided thereon and connected and communicated with an outside, and an installation opening (112) formed at the other end, wherein the clamping and positioning unit (2) is placed and mounted in the mold cavity (11) through the installation opening (112), and is further restricted and fixed in the mold cavity (11) through a closing element (3). However, the closing element (3) may be embodied in a form of a plug that closes the installation opening (112), and the closing element (3) may be fixed through a positioning fastener (4).

Further, the clamping and positioning unit (2) may be composed of a movable seat (21), a clamping member (211), a piston seat (22), and a plurality of elastic members (23). The movable seat (21) is provided at the embedding opening (111). The center of the movable seat (21) has an embedding hole (20) to allow the clamping rod (A) of the workpiece to be processed be inserted and embedded. The clamping member (211) for clamping the clamping rod (A) is provided around the movable seat (21). The piston seat (22) is provided at the bottom of the movable seat (21). The plurality of elastic members (23) for supporting are provided around the piston seat (22) corresponding with the mold cavities (11). The clamping and positioning unit (2) is mainly used to clamp and install the clamping rod (A) of the workpiece to be processed. In addition to the structure of the above-mentioned manner, it can also be similar with the technical structure according to Taiwan Pat. No. 1580514(B) and M581023(U), applied and held by the inventor, wherein a base body (24) may be provided at the bottom of the piston seat (22) for jacking up the clamping rod.

When the clamping rod (A) of the workpiece to be processed is inserted and mounted in the clamping and positioning unit (2) through the insertion port (111), the piston seat (22) is pushed away by the stretching of the elastic member (23) of the clamping and positioning unit (2), and the gas that was originally input to push up the piston seat (22) rises is led out from the air flow channels (12) through the air guide ports (13), so that the clamping member (211) of the clamping and positioning unit (2) clamps and holds the clamping rod (A). On the contrary, the gas is introduced from the air flow channels (12) through the air guide ports (13), so that the clamping and positioning unit (2) releases or pushes the clamping rod (A). Here, the clamping and positioning unit (2) is not a main claiming feature, which may a clamping and positioning unit (2) of any form.

In the first embodiment, the two air guide ports (13) are arranged on the same side of the base plate (1). However, it may also have one air guide port (13) be arranged on one side of the base plate (1), while another air guide port (13) be arranged on the other side of the base plate (1), so that the two air guide ports (13) are arranged on the opposite sides.

Figure 6:
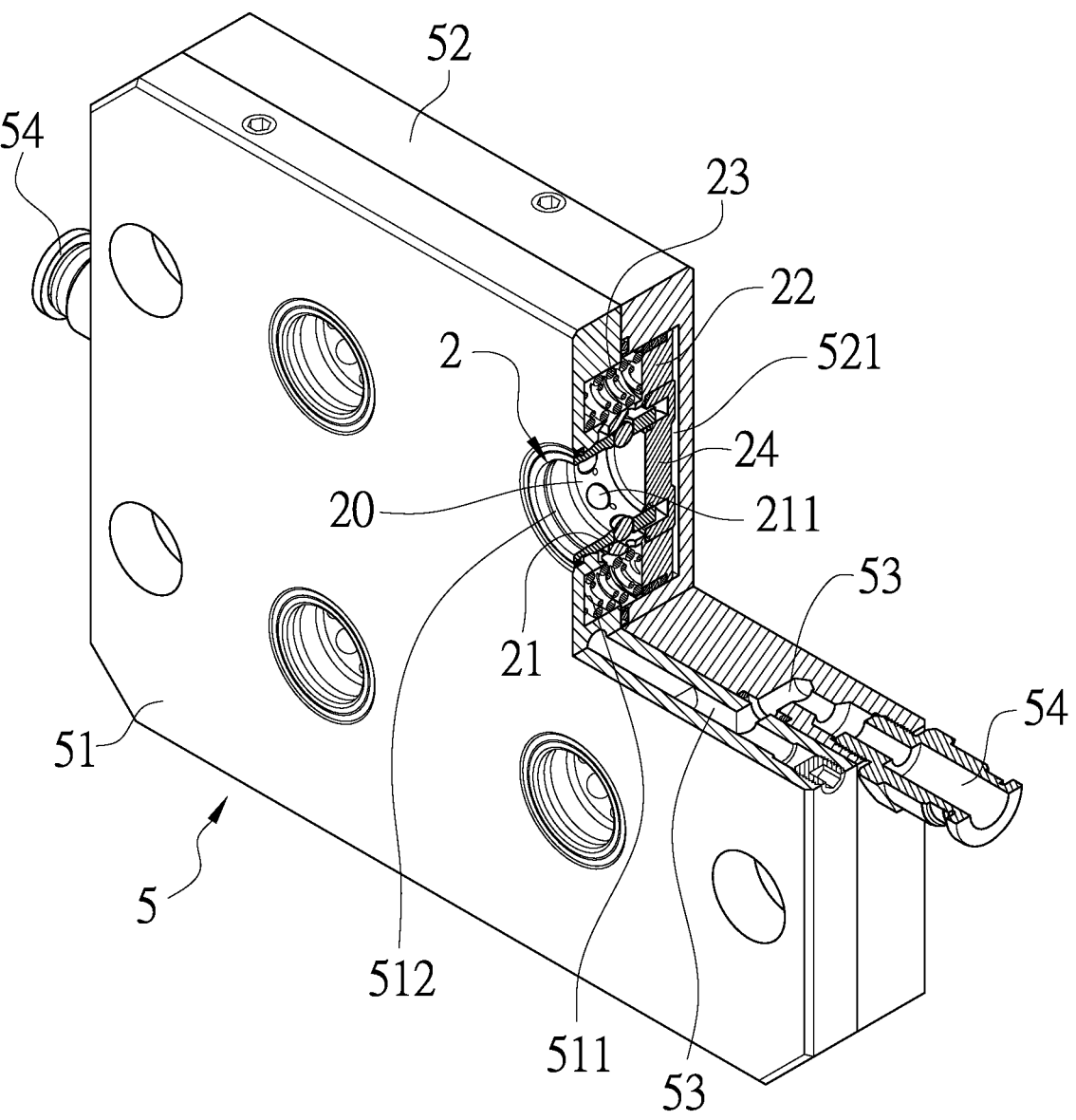
FIG. 6 is a partial sectional view of a second embodiment of the present invention (4 cavities).

Next, referring to FIG. 6, a partial sectional view of a second embodiment of the present invention is illustrated, wherein the clamping and positioning module includes:

a base plate (5), comprising an upper base plate (51) and a lower base plate (52) locked with each other, wherein the upper base plate (51) has a first half mold cavity (511) disposed therein, wherein the first half mold cavity (511) has an embedding opening (512) provided thereon and communicated with an outside, wherein the lower base plate (52) has a second half mold cavity (521) disposed therein opposite to the first half mold cavity (511) of the upper base plate (51), wherein the first half mold cavity (511) and the second half mold cavity (521) respectively have an air flow channel (53) arranged therein, wherein the base plate (5) has two air guide ports (54) arranged thereon, wherein the air guide ports (54) are respectively connected with the air flow channels (53); and a plurality of clamping and positioning units (2), respectively mounted and positioned between the first half mold cavity (511) and the second half mold cavity (521), wherein the clamping and positioning unit (2) has an embedding hole (20) for embedding a clamping rod (A), wherein the embedding hole (20) is corresponding to the embedding opening (512).

Figure 7:
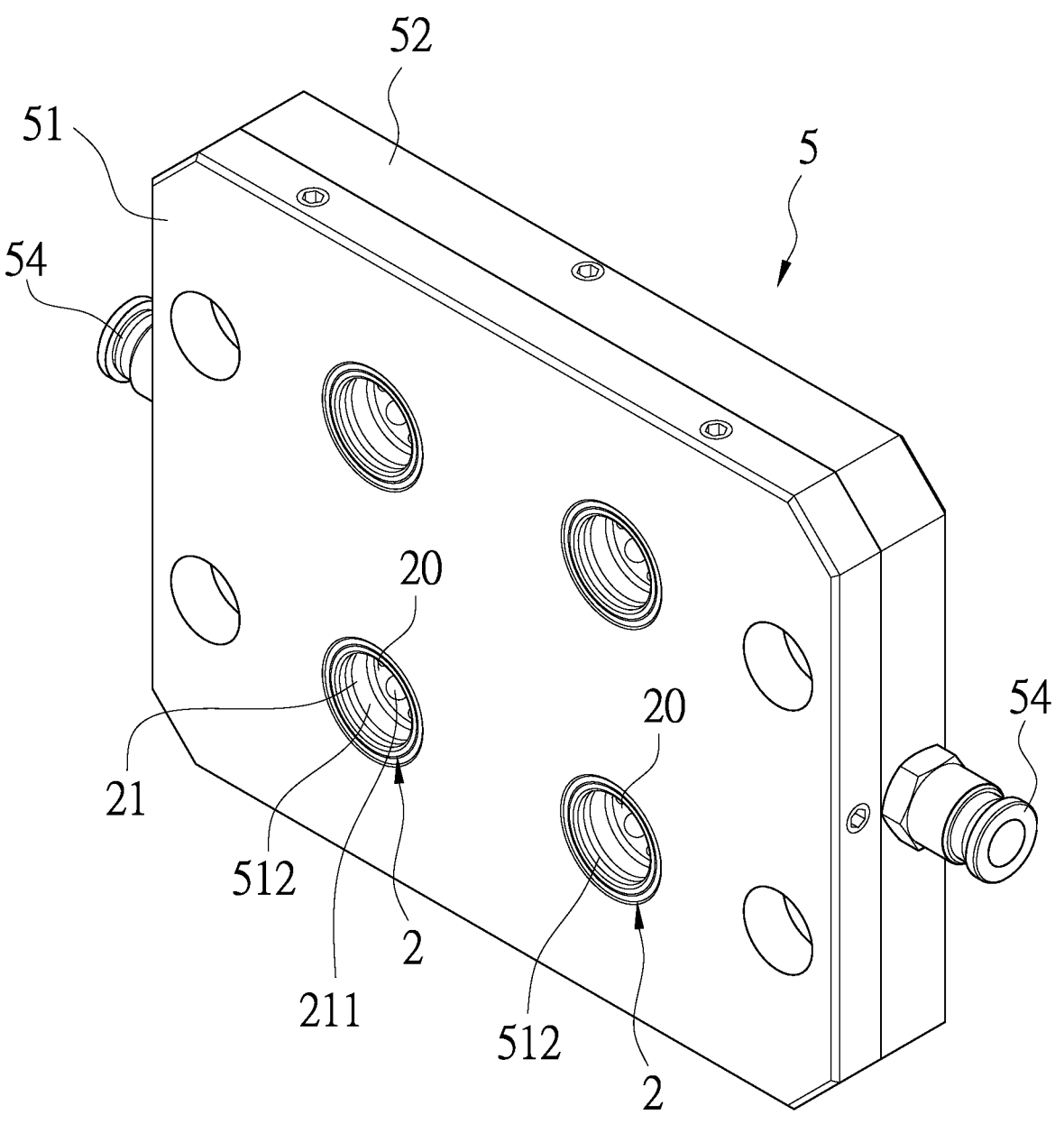
FIG. 7 is a perspective view of the above second embodiment of the present invention (4 cavities).
Figure 8:
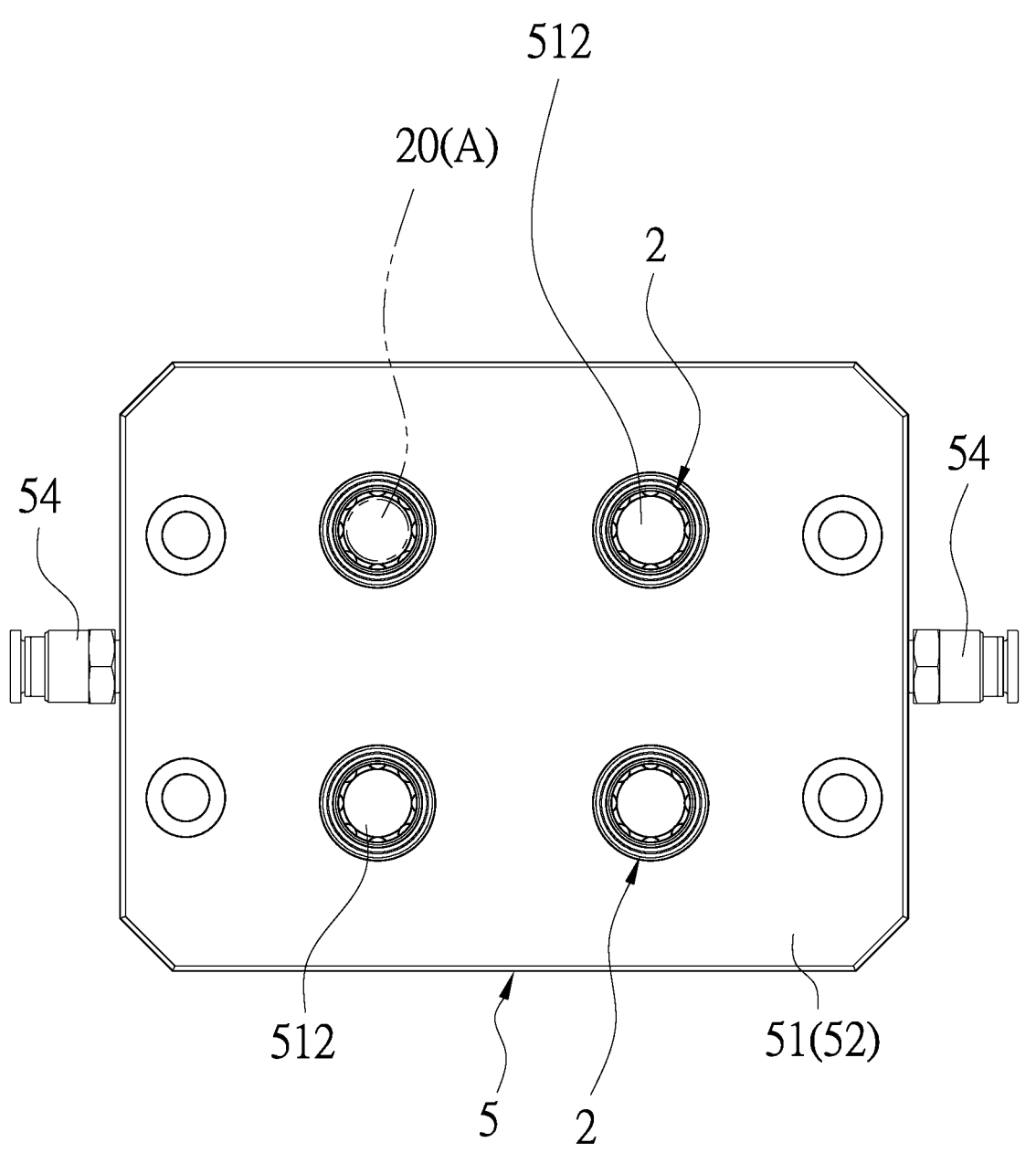
FIG. 8 is a plane perspective view of the above second embodiment of the present invention (4 cavities).

For a second embodiment, referring to FIGS. 6 to 8, with 4 cavities illustrated, according to this embodiment, the base plate (5) is composed of an upper base plate (51) and a lower base plate (52), wherein the upper base plate (51) has a first half mold cavity (511) disposed therein, while the lower base plate (52) has a second half mold cavity (521) located inside the lower base plate (52) corresponding with and opposite to the first half mold cavity (511) of the upper base plate (51), wherein the first half mold cavity (511) and the second half mold cavity (521) are used for the clamping and positioning unit (2) to be inserted and installed, wherein after the clamping and positioning unit (2) is placed and installed, the upper base plate (51) and the lower base plate (52) are allowed to be locked and coupled with each other.

When the clamping rod (A) of the workpiece to be processed is inserted and mounted in the clamping and positioning unit (2) through the insertion port (512), the piston seat (22) is pushed away by the stretching of the elastic member (23) of the clamping and positioning unit (2), and the gas that was originally input to push up the piston seat (22) rises is led out from the air flow channels (53) through the air guide ports (54), so that the clamping member (211) of the clamping and positioning unit (2) clamps and holds the clamping rod (A). On the contrary, the gas is introduced from the air flow channels (53) through the air guide ports (54), so that the clamping and positioning unit (2) releases or pushes the clamping rod (A).

Compared with the conventional structure, advantages and effects provided by the present invention include the following:

1. The present invention effectively improves the drawbacks of errors rendered by conventional independent installation. The integrated modular design of the clamping and positioning module integrates multiple clamping and positioning units, so as to simplify the process and time of installation, and facilitate on-site installation and wiring and future maintenance.

2. Through the technology that modularly integrating the clamping and positioning units into the base plate, the present invention can effectively increase the strength in the overall mechanical property, and improve the installation accuracy and the precision of the subsequent processing process.

3. As the above, through the integrated modular design, the volume and weight can be reduced, and the advantages and effects of light weight and thin profile can be achieved.

4. The present invention can provide an integrated modular technology according to the needs of the industry, and can expand the application of the customized market.

What is claimed is:

1. A clamping and positioning module, comprising:

a base plate, which has a plurality of mold cavities arranged therein, wherein each mold cavity has an embedding opening connected and communicated with an outside, wherein the embedding opening is located on an upper end surface of the base plate, wherein an installation opening is formed at the other end of the mold cavity opposite to the embedding opening, wherein each mold cavity has two air flow channels arranged therein, wherein the base plate has two air guide ports arranged thereon, wherein the air guide ports are respectively connected with the air flow channels;

a plurality of clamping and positioning units, each of which is assembled in the mold cavity through the installation opening, wherein the clamping and positioning unit comprises a movable seat mounted at the embedding opening, such that the movable seat is maintained in a same plane as the upper end surface of the base plate, a center of the movable seat having an embedding hole to allow a clamping rod of a workpiece to be processed for insertion and embedment, a clamping member for clamping the clamping rod provided around the movable seat, a piston seat provided at a bottom of the movable seat, a plurality of elastic members for supporting provided around the piston seat corresponding with the mold cavities, and a base body provided at a bottom of the piston seat for closing the embedding hole and jacking up the clamping rod a plurality of closing elements, each of which is correspondingly embedded in the installation opening to seal and close the entire installation opening and to position and retain the clamping and positioning unit in the mold cavity; and a gas introduced into or discharged from the air flow channels through the air guide ports, so that the clamping and positioning unit clamps or releases and pushes the clamping rod.

2. The clamping and positioning module as claimed in claim 1, further comprising a positioning fastener correspondingly coupled at the installation opening, so as to restrict the positioning of the closing element.

3. The clamping and positioning module as claimed in claim 1, wherein the two air guide ports are arranged on a same side of the base plate.

4. The clamping and positioning module as claimed in claim 1, wherein one of the air guide ports is arranged on one side of the base plate, while the other air guide port is arranged on the other side, so that the two air guide ports are arranged on the opposite sides.

5. A clamping and positioning module, comprising:

an upper base plate and a lower base plate locked with each other, wherein the upper base plate has a first half mold cavity disposed therein, wherein the first half mold cavity has an embedding opening provided thereon and communicated with an outside, wherein the lower base plate has a second half mold cavity terminated by a wall member and disposed therein opposite to the first half mold cavity of the upper base plate, wherein the first half mold cavity and the second half mold cavity respectively have an air flow channel arranged therein, wherein the base plate has two air guide ports arranged thereon, wherein the air guide ports are respectively connected with the air flow channels;

a plurality of clamping and positioning units, respectively mounted and positioned between the first half mold cavity and the second half mold cavity, wherein the clamping and positioning unit comprises a movable seat mounted at the embedding opening, such that the movable seat is maintained in a same plane as an upper end surface of the base plate, a center of the movable seat having an embedding hole to allow a clamping rod of a workpiece to be processed for insertion and embedment, a clamping member for clamping the clamping rod provided around the movable seat, a piston seat provided at a bottom of the movable seat, a plurality of elastic members for supporting provided around the piston seat corresponding with the mold cavities, and a base body provided at a bottom of the piston seat for closing the embedding hole and jacking up the clamping rod;

said wall member of said lower base plate for sealing and closing the installation opening and to position and retain the clamping and positioning unit in the first half mold cavity and the second half mold cavity; and a gas introduced into or discharged from the air flow channels through the air guide ports, so that the clamping and positioning unit clamps or releases and pushes the clamping rod.

6. The clamping and positioning module as claimed in claim 5, wherein the two air guide ports are arranged on a same side of the base plate.

7. The clamping and positioning module as claimed in claim 5, wherein one of the air guide ports is arranged on one side of the base plate, while the other air guide port is arranged on the other side, so that the two air guide ports are arranged on the opposite sides.

* * * * *